(12) United States Patent
Nobuoka et al.

(10) Patent No.: US 11,978,240 B2
(45) Date of Patent: May 7, 2024

(54) INFORMATION PROCESSING DEVICE AND CONTROL METHOD THEREOF

(71) Applicant: TOSHIBA TEC KABUSHIKI KAISHA, Tokyo (JP)

(72) Inventors: Tetsuya Nobuoka, Mishima Shizuoka (JP); Yuishi Takeno, Numazu Shizuoka (JP); Natsuko Fujii, Fujisawa Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 358 days.

(21) Appl. No.: 17/325,371

(22) Filed: May 20, 2021

(65) Prior Publication Data

US 2022/0180104 A1  Jun. 9, 2022

(30) Foreign Application Priority Data

Dec. 4, 2020  (JP) .................................. 2020-201910

(51) Int. Cl.
*G06V 10/26* (2022.01)
*G06F 18/22* (2023.01)
(Continued)

(52) U.S. Cl.
CPC .............. *G06V 10/26* (2022.01); *G06F 18/22* (2023.01); *G06K 7/10722* (2013.01); *G06K 19/06028* (2013.01); *G06V 10/44* (2022.01); *G06V 10/454* (2022.01); *G06V 20/52* (2022.01); *G06N 3/02* (2013.01)

(58) Field of Classification Search
CPC ...... G06V 10/26; G06V 10/44; G06V 10/454; G06V 10/772; G06V 20/52; G06F 18/22; G06K 7/10722; G06K 19/06028; G06N 3/02; G06N 3/045
See application file for complete search history.

(56) References Cited

U.S. PATENT DOCUMENTS 7,420,465 B2 *  9/2008  Ritter ................. G08B 21/0283
                                                340/572.1
7,710,268 B2 *  5/2010  Schoen .............. G08B 13/1427
                                                726/16
(Continued)

FOREIGN PATENT DOCUMENTS

EP       2922000 A1 *  9/2015  ............. G06Q 10/08
JP       2002-230149      8/2002
(Continued)

*Primary Examiner* — John B Strege
(74) *Attorney, Agent, or Firm* — Amin, Turocy & Watson, LLP

(57) ABSTRACT

According to one embodiment, an information processing device includes acquisition means, detection means, and specifying means. The acquisition means acquires image data according to a lost article to which a symbol of a user is attached and identification information according to a group to which the user belongs. The detection means performs analysis set for each item of identification information according to the group with respect to the image data according to the lost article and detects the identification information for identifying the user included in the symbol. The specifying means specifies the user from the identification information detected by the detection means.

7 Claims, 7 Drawing Sheets

(51) Int. Cl.
*G06K 7/10* (2006.01)
*G06K 19/06* (2006.01)
*G06N 3/02* (2006.01)
*G06V 10/44* (2022.01)
*G06V 20/52* (2022.01)

(56) References Cited

U.S. PATENT DOCUMENTS

| | | | |
|---|---|---|---|
| 9,053,453 B2 * | 6/2015 | Noh | G06Q 10/087 |
| 11,080,578 B1 * | 8/2021 | Frizzell | G06K 19/06028 |
| 2003/0208416 A1 * | 11/2003 | Watters | G06Q 10/087 |
| | | | 705/28 |
| 2015/0269832 A1 * | 9/2015 | Candillier | G08B 21/24 |
| | | | 340/539.32 |
| 2016/0378877 A1 * | 12/2016 | Khemka | G06F 16/9554 |
| | | | 235/375 |
| 2019/0258814 A1 * | 8/2019 | Heeter | G06K 19/06037 |
| 2021/0158117 A1 * | 5/2021 | Wilmot, Jr. | G06K 19/06037 |

FOREIGN PATENT DOCUMENTS

| | | | | |
|---|---|---|---|---|
| JP | 2005-277771 | | 10/2005 | |
| JP | 2010-117870 | | 5/2010 | |
| WO | WO-2010099022 A1 * | | 9/2010 | G06Q 10/08 |
| WO | WO-2017130226 A1 * | | 8/2017 | |

* cited by examiner

FIG. 5

| TEACHER ID | PASSWORD | TERMINAL ID | GROUP ID |
|---|---|---|---|
|  |  |  |  |
|  |  |  |  |
| ⋮ | ⋮ | ⋮ | ⋮ |

| GROUP ID | 999 | | |
|---|---|---|---|
| KINDERGARTENER ID | NAME | CONTACT INFORMATION | EMBLEM |
| 001 |  |  | ☆ |
| 002 |  |  | ◇ |
| 003 |  |  | ☆ ◇ |
| ⋮ | ⋮ | ⋮ | ⋮ |

INFORMATION PROCESSING DEVICE AND CONTROL METHOD THEREOF

CROSS-REFERENCE TO RELATED APPLICATION

This application is based upon and claims the benefit of priority from Japanese Patent Application No. 2020-201910, filed on Dec. 4, 2020, the entire contents of which are incorporated herein by reference.

FIELD

Exemplary embodiments described herein relate to an information processing device and a control method thereof.

BACKGROUND

In many childcare institutions such as kindergartens and nursery schools, names are written on belongings of kindergarteners. By writing the name on the belongings, even if there is a lost article, a kindergartener who is the owner of the lost article can be specified at a glance. On the other hand, if the name is directly written, it is concerned that personal information is leaked. Therefore, a system that can read a data code such as a barcode and a two-dimensional code attached to the lost article with an information terminal such as a smartphone to detect owner data stored in the data code is proposed. However, decoders of barcodes, two-dimensional codes, and the like can be easily obtained, and thus it is concerned that, for example, a third person other than teachers of a childcare institution to which a kindergartener belongs can specify the kindergartener. Therefore, there is a demand for a mechanism that can specify the owner of a lost article without being known by a third person.

DESCRIPTION OF THE DRAWINGS

FIG. 5 is a schematic diagram illustrating an example of a group data record stored in a group database;

FIG. 6 is a schematic diagram illustrating an example of a personal data record stored in a personal database;

DETAILED DESCRIPTION

An aspect of the embodiment is to provide an information processing device that can specify the owner of a lost article without being known by a third person and a control method thereof.

In general, according to one embodiment, the information processing device includes acquisition means, detection means, and specifying means. The acquisition means acquires image data according to a lost article to which a symbol of a user is attached and identification information according to a group to which the user belongs. The detection means performs analysis set for each item of identification information according to the group with respect to the image data according to the lost article and detects the identification information for identifying the user included in the symbol. The specifying means specifies the user from the identification information detected by the detection means.

Hereinafter, an embodiment is described with reference to the drawings.

Figure 1:
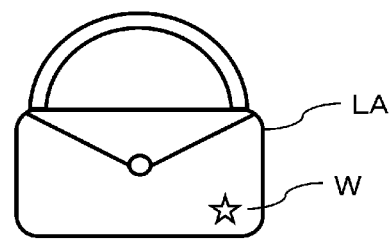
FIG. 1 is a schematic diagram illustrating an example of a lost article to which an emblem is attached.

FIG. 1 is a schematic diagram illustrating an example of a lost article LA to which an emblem W is attached. According to the present embodiment, an information processing system 1 (see FIG. 2) that specifies a kindergartener who is an owner from the emblem W attached to the lost article LA found in a childcare institution such as a kindergarten or a nursery school is exemplified. The lost article LA is a belonging that a kindergartener loses. The emblem W is attached to each belonging of the kindergartener. The emblem W is an example of a symbol. The symbol may be a figure, a symbol, an image of a character, or the like and has a very high degree of freedom.

Figure 2:
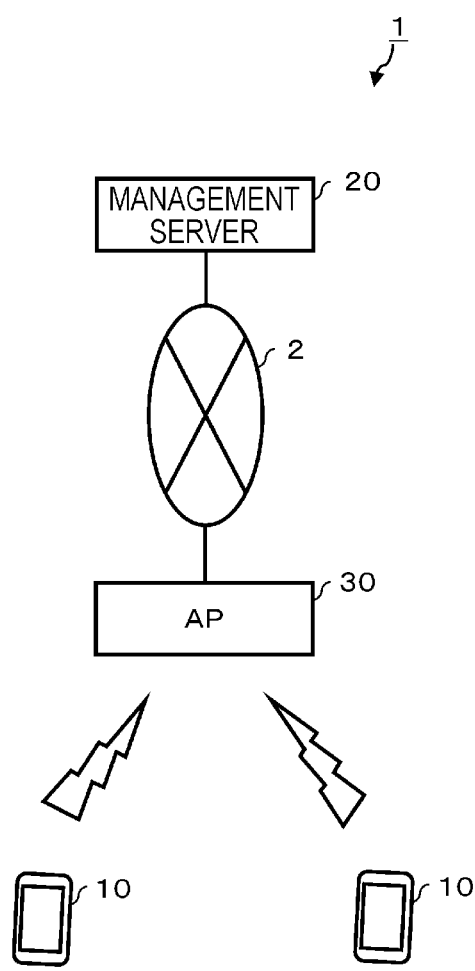
FIG. 2 is a diagram illustrating the entire configuration of an information processing system according to an embodiment.

FIG. 2 is a schematic diagram illustrating a schematic configuration of the information processing system 1 according to the present embodiment. The information processing system 1 illustrated in FIG. 2 includes an information terminal 10, a management server 20, an access point 30 and a communication network 2. The information terminal 10 can perform wireless communication with the access point 30. The information terminal 10 connected to the access point 30 by the wireless communication can perform data communication with the management server 20 via the communication network 2. The information terminal 10 is an electronic device including an input device and a display device. For example, a smartphone or a tablet terminal is used as the information terminal 10. According to the present embodiment, a teacher of the childcare institution possesses the information terminal 10. The management server 20 is an example of the information processing device. The management server 20 is a computer device that centrally controls the operation of the information processing system 1. The management server 20 controls a lost article processing service performed via the information terminal 10. The communication network 2 connects the information terminal 10 and the management server 20 by wire or wirelessly. For example, the Internet is used as the communication network 2.

Figure 3:
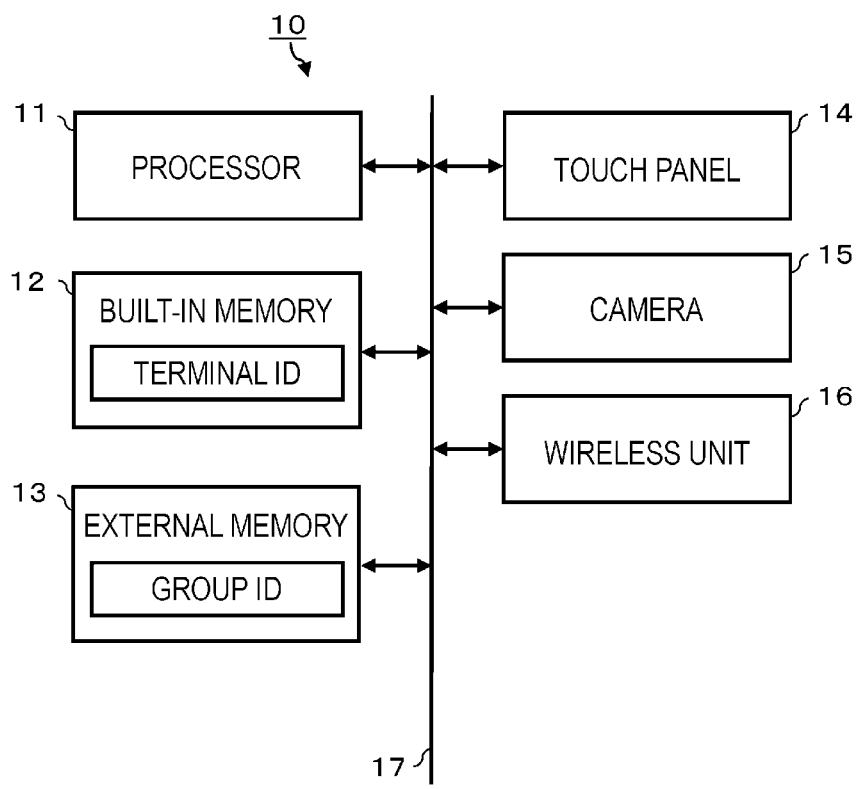
FIG. 3 is a block diagram illustrating a main circuit configuration of an information terminal.

FIG. 3 is a block diagram illustrating a main circuit configuration of the information terminal 10. The information terminal 10 as illustrated in FIG. 3 includes a processor 11, a built-in memory 12, an external memory 13, a touch panel 14, a camera 15, a wireless unit 16, and a system transmission line 17. The system transmission line 17 includes an address bus, a data bus, a control signal line, and the like. The information terminal 10 connects the processor 11, the built-in memory 12, the external memory 13, the touch panel 14, the camera 15, and the wireless unit 16 to the system transmission line 17. Also, the processor 11, the built-in memory 12, and the external memory 13 are connected to each other via the system transmission line 17 to configure a computer that performs an information process for controlling the information terminal 10.

The processor 11 corresponds to a central part of the computer. The processor 11 controls each portion in order to realize various functions as the information terminal 10 according to an operating system or an application program. The processor 11 is, for example, a central processing unit (CPU).

The built-in memory 12 corresponds to a main memory portion of the computer. The built-in memory 12 includes a non-volatile memory area and a volatile memory area. The built-in memory 12 stores an operating system or an application program in a non-volatile memory area. The built-in memory 12 stores data required for the processor 11 to perform a process to control each portion, in a volatile memory area. In addition, the built-in memory 12 uses the volatile memory area as a work area to which data is appropriately rewritten by the processor 11. The non-volatile memory area is, for example, a read only memory (ROM). The volatile memory area is, for example, a random access memory (RAM).

The external memory 13 corresponds to an auxiliary storage portion of the computer. For example, an SD memory card, a USB memory, or the like can be the external memory 13. The external memory 13 stores data to be used by the processor 11 for performing various processes, data generated by a process in the processor 11, or the like. The external memory 13 may store the application program.

An information processing application program stored in the external memory 13 is included in the application program. Hereinafter, an information processing application program is abbreviated as an information processing app. The information processing app is used if a teacher finds the lost article LA to which the emblem W is attached in the childcare institution to which the information processing system 1 is introduced. A method of installing the information processing app to the external memory 13 is not particularly limited. A control program can be recorded in a removable recording medium or a control program can be delivered by communication via a network to be installed in the external memory 13. The form of the recording medium is not particularly limited as long as the recording medium can store a program and can be read by a device, like a CDROM, a memory card, or the like. In addition, an information processing app may be installed in the built-in memory 12, not in the external memory 13.

The touch panel 14 is a device including both an input device and a display device of the information terminal 10. The touch panel 14 detects a touch position with respect to a displayed image and outputs touch position information thereof to the processor 11.

The camera 15 is an image capturing device built in the information terminal 10. The camera 15 operates as an image capturing device of a still image or a moving image or as a scanning device of a data code such as a barcode or a two-dimensional code, by an application program installed in the information terminal 10. The camera 15 is an example of a code reader.

The wireless unit 16 performs wireless communication of data according to a wireless communication protocol with the access point 30.

The information terminal 10 of the configuration stores a terminal ID in the non-volatile memory area of the built-in memory 12. The terminal ID is terminal identification data set for each information terminal 10 in order to identify each information terminal 10, individually.

The information terminal 10 stores a group ID in the external memory 13. The group ID is a unique code assigned to each group in order to identify a group. The group is a childcare institution such as a kindergarten and a nursery school registered as a group to use the information processing system 1.

Figure 4:
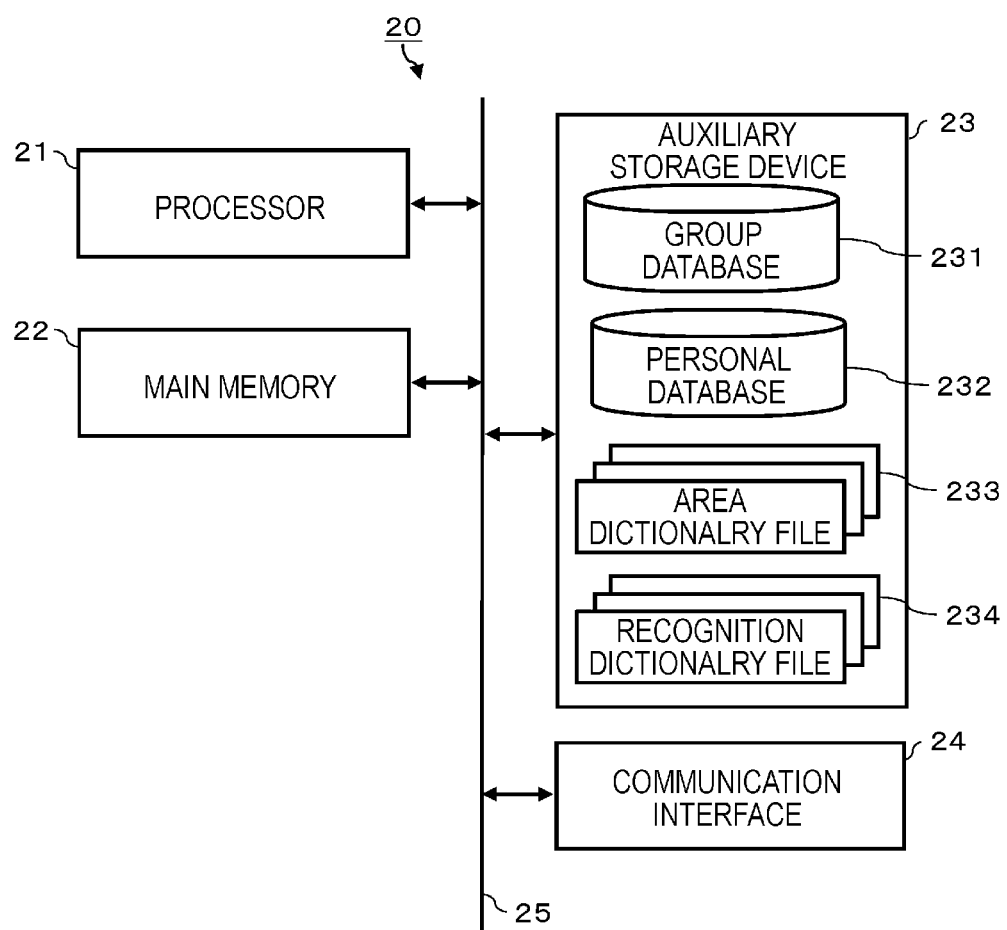
FIG. 4 is a block diagram illustrating the main circuit configuration of a management server.

FIG. 4 is a block diagram illustrating a main circuit configuration of the management server 20. The management server 20 illustrated in FIG. 4 includes a processor 21, a main memory 22, an auxiliary storage device 23, a communication interface 24, and a system transmission line 25. The system transmission line 25 includes an address bus, a data bus, a control signal line, and the like. The management server 20 connects the processor 21, the main memory 22, the auxiliary storage device 23, and the communication interface 24 to the system transmission line 25. In the management server 20, a computer is configured with the processor 21, the main memory 22, and the auxiliary storage device 23, together with the system transmission line 25 connected thereto.

The processor 21 corresponds to the central part of the computer. The processor 21 controls each unit so as to realize various functions as the management server 20 according to the operating system or the application program. The processor 21 is, for example, a CPU.

The main memory 22 corresponds to a main memory portion of the computer. The main memory 22 includes a non-volatile memory area and a volatile memory area. The main memory 22 stores an operating system or an application program in the non-volatile memory area. The main memory 22 may store data required by the processor 21 for controlling each unit in the non-volatile or volatile memory area. The main memory 22 uses the volatile memory area as a work area to which the data is appropriately rewritten by the processor 21. The non-volatile memory area is, for example, a ROM. The volatile memory area is, for example, a RAM.

The auxiliary storage device 23 corresponds to the auxiliary storage portion of the computer. For example, an electric erasable programmable read-only memory (EEPROM) (Registered Trademark), a hard disk drive (HDD), a solid state drive (SSD), or the like can be the auxiliary storage device 23. The auxiliary storage device 23 stores data used by the processor 21 to perform various processes, data generated by a process in the processor 11, or the like. The auxiliary storage device 23 may store the application program.

The communication interface 24 is connected to the communication network 2. The communication interface 24 can perform data communication according to the communication protocol with the other devices connected via the communication network 2.

In the auxiliary storage device 23, the management server 20 stores a group database 231 (see FIG. 5), a personal database 232 (see FIG. 6), an area dictionary file 233, and a recognition dictionary file 234.

FIG. 5 is a schematic diagram illustrating an example of a group data record stored in the group database 231. The group data record illustrated in FIG. 5 includes a teacher ID, a password, the terminal ID, the group ID, and the like. The teacher ID is a unique code assigned to each teacher in order to identify a teacher. The password is information that is freely set by a teacher who is identified with the teacher ID by operating the information terminal 10 in order to log in the information processing app. The terminal ID and the group ID are IDs set by the information terminal 10 possessed by the teacher identified with the corresponding teacher ID. In addition, the group data record is not limited to data of the above items.

FIG. 6 is a schematic diagram illustrating an example of a personal data record stored in the personal database 232. The personal data record illustrated in FIG. 6 includes a kindergartener ID, the name of a kindergartener, contact information, and the emblem W, and the like for each group ID. The kindergartener ID is a unique code assigned to each kindergartener in order to identify the kindergartener. The contact information is, for example, a mobile phone number or an e-mail address of a guardian of the kindergartener. Data such as the kindergartener ID, the name of the kindergartener is included in the emblem W. According to the present embodiment, the emblem W is determined for each kindergartener and is stored in the personal data record, in advance. The emblem W may be determined by the group which is the childcare institution, the kindergartener, or the like. For example, data of the emblem W which is desired to be used by the group, the kindergartener, or the like, or an image of the emblem W captured by the information terminal such as a smartphone may be stored in the personal data record. For example, the star-shaped emblem W is attached to a belonging of the kindergartener ID "001". Two types of star-shaped and diamond-shaped emblems W are attached to the belongings of the kindergartener ID "003". That is, even if the emblems W are the same, the other emblem W is combined to identify the kindergartener, and thus one or the plurality of emblems W are attached to a belonging of the kindergartener. The personal data record is not limited to the above item of data.

The description refers back to FIG. 4.

The area dictionary file 233 is a data file in which dictionary information according to an image division method of extracting the emblem W attached to the lost article LA is stored. The area dictionary file 233 is set for each group ID. The recognition dictionary file 234 is a data file in which dictionary information according to an image recognition method of recognizing the extracted emblem W is stored. The recognition dictionary file 234 is set for each group ID. In this manner, according to the present embodiment, the unique area dictionary file 233 and the unique recognition dictionary file 234 are set for each group ID. Also, image division and image recognition of the emblem W stored in the personal data record of the personal database 232 corresponding to the group ID are performed by using the unique area dictionary file 233 and the unique recognition dictionary file 234. Therefore, the emblem W can be accurately recognized.

Figure 7:
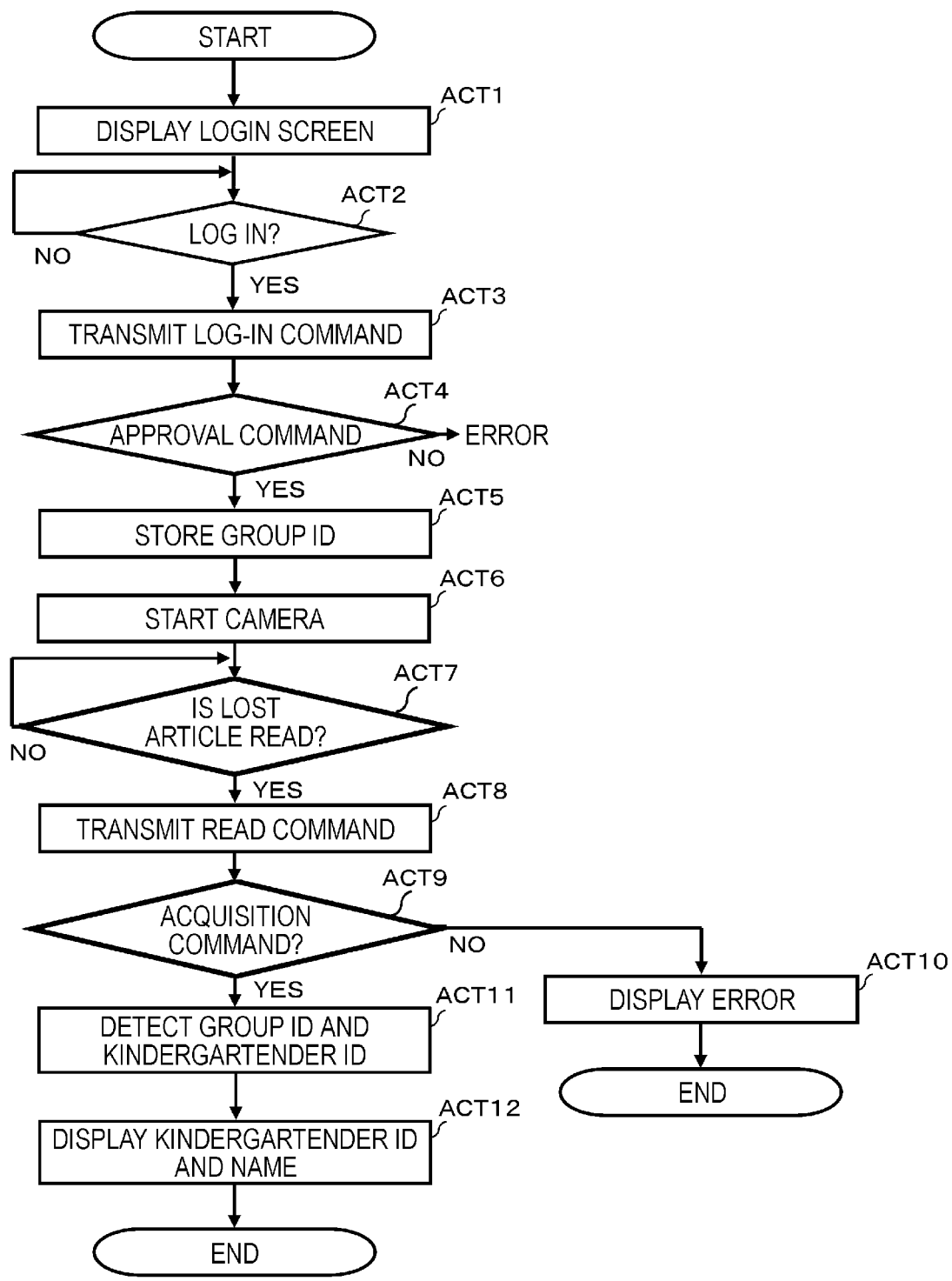
FIG. 7 is a flowchart illustrating a main control procedure of a processor in the information terminal.
Figure 8:
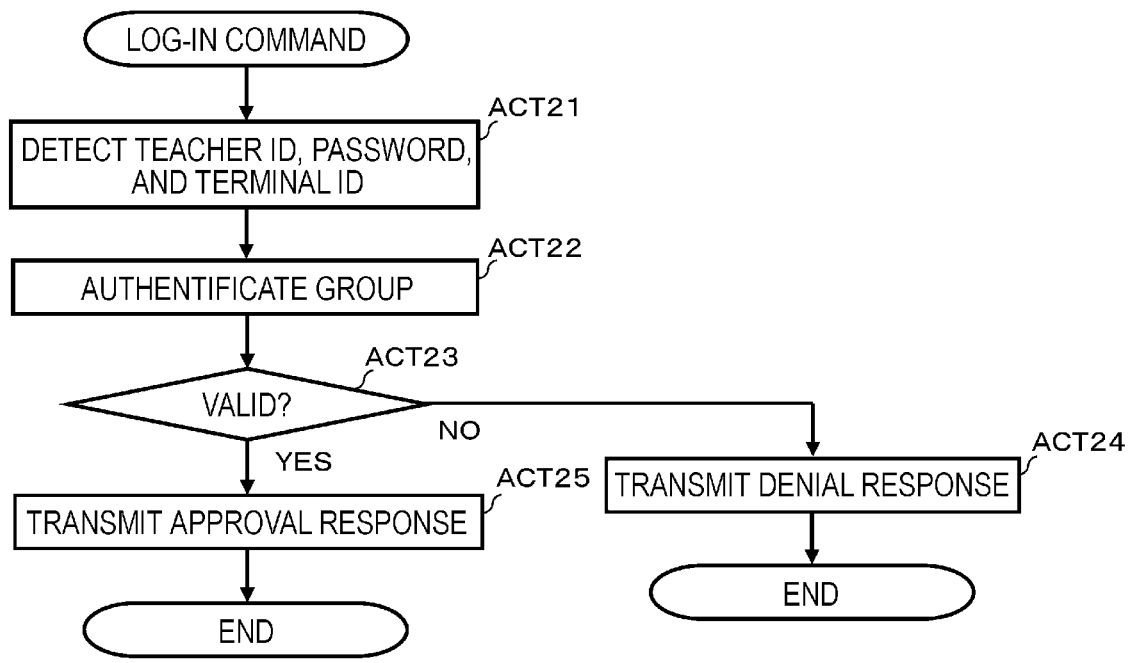
FIG. 8 is a flowchart illustrating the main control procedure of the processor in the management server.
Figure 9:
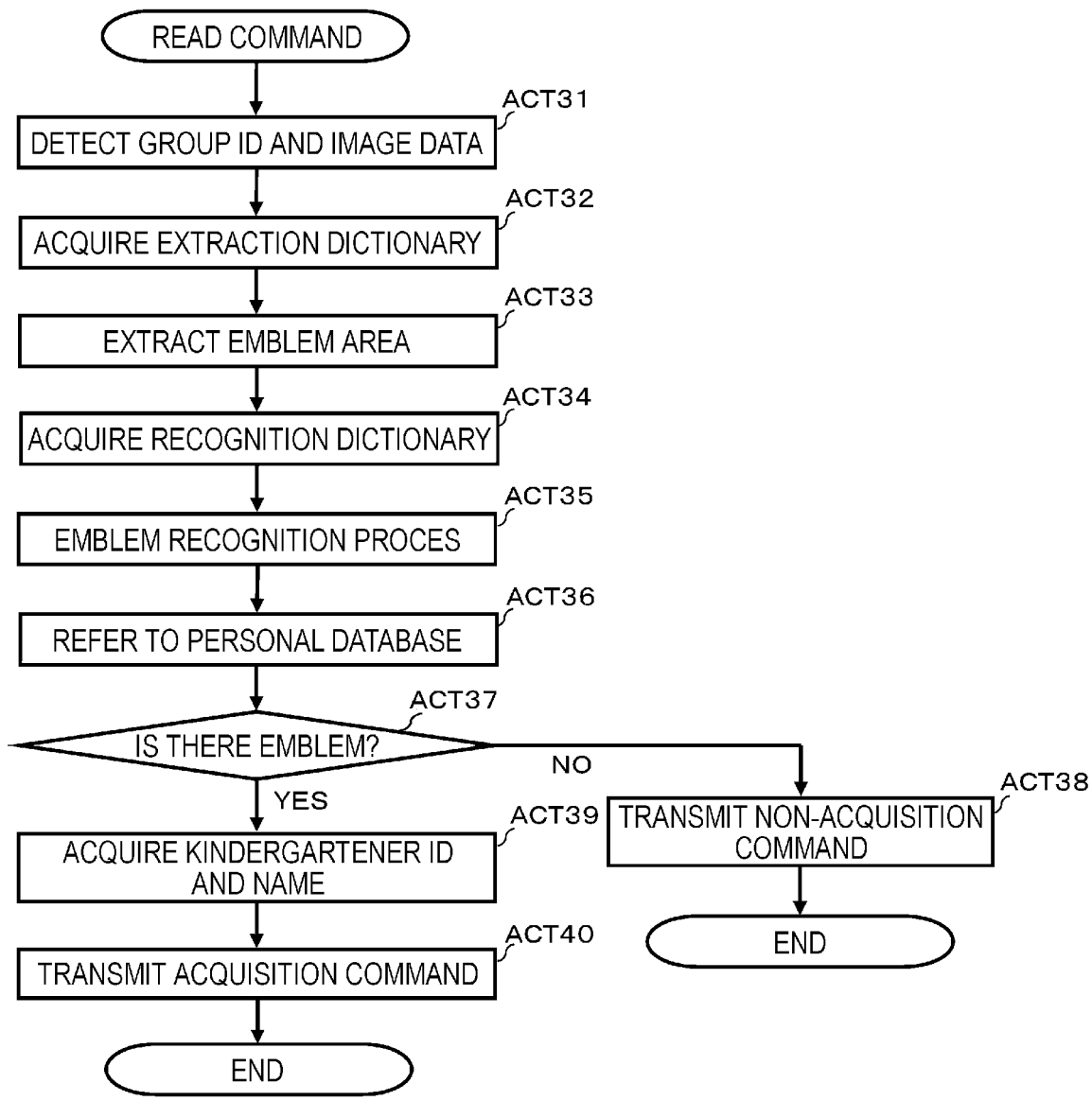
FIG. 9 is a flowchart illustrating the main control procedure of the processor in the management server.

FIG. 7 is a flowchart illustrating a procedure of a main information process performed by the processor 11 of the information terminal 10. The control program is stored in the built-in memory 12 or the external memory 13. FIGS. 8 and 9 are flowcharts illustrating procedures of the main information process performed by the processor 21 of the management server 20. The control program is stored in the main memory 22 or the auxiliary storage device 23. Hereinafter, an operation of the information processing system 1 is performed by using these diagrams. In addition, the procedures of the operations and the contents thereof described below are examples. As long as the same result can be obtained, the procedures and contents thereof are not particularly limited.

First, a teacher who finds the lost article LA to which the emblem W is attached starts the information processing app of the information terminal 10. If the information processing app starts, the processor 11 initiates an information process of the procedure illustrated in the flowchart of FIG. 7.

The processor 11 displays a log-in screen on the touch panel 14 as ACT 1. The log-in screen is a screen for instructing the teacher to perform a log-in operation. Though not illustrated, an input section for inputting the teacher ID and the password and an image of a confirmation button for instructing input confirmation are displayed on the log-in screen. The teacher who checks the log-in screen inputs the teacher ID and the password to the input section and touches the confirmation button.

The processor 11 checks whether the confirmation button is touched as ACT 2. If the confirmation button is touched, the processor 11 determines YES in ACT 2 and proceeds to ACT 3. The processor 11 controls the wireless unit 16 so as to transmit the log-in command to the management server 20 as ACT 3. According to this control, the wireless unit 16 wirelessly transmits a log-in command. The log-in command is received by the access point 30 and sent to the management server 20 via the communication network 2. The teacher ID, the password, and the terminal ID are included in the log-in command.

The processor 21 of the management server 20 that receives the log-in command initiates a command reception process of the procedure illustrated in the flowchart of FIG. 8.

The processor 21 detects the teacher ID, the password, and the terminal ID from the log-in command as ACT 21. Also, the processor 21 authenticates the identified group with the teacher ID, the password, and the terminal ID as ACT 22. Specifically, the processor 21 checks whether the group data records including the teacher ID, the password, and the terminal ID are present in the group database 231. If the corresponding group data record is present in the group database 231, the processor 21 determines whether the group authentication is valid. In contrast, if the corresponding group data record is not present in the group database 231, the processor 21 determines that the group authentication is invalid.

The processor 21 checks the result of the group authentication as ACT 23. Here, if the authentication result is invalid, the processor 21 determines NO in ACT 23 and proceeds to ACT 24. The processor 21 controls the communication interface 24 so that a denial response command is transmitted to the information terminal 10 as ACT 24. According to this control, the denial response command is transmitted via the communication interface 24. The denial response command is wirelessly transmitted from the access point 30 via the communication network 2 and receives the information terminal 10 of a log-in command transmission source. With the above, the processor 21 ends the log-in command reception process.

If the authentication result is valid, the processor 21 determines YES in ACT 23 and proceeds to ACT 25.

The processor 21 controls the communication interface 24 so that the approval response command is transmitted to the information terminal 10 as ACT 25. According to this control, the approval response command is transmitted via the communication interface 24. The approval response command is wirelessly transmitted from the access point 30 via the communication network 2 and is received by the information terminal 10 of the log-in command transmission source. The group ID is included in the approval response command. With the above, the processor 21 ends the log-in command reception process.

The description refers back to FIG. 7.

The processor 11 of the information terminal 10 that controls the transmission of the log-in command in ACT 3 waits for the approval response command from the management server 20 as ACT 4. If the denial response command is received from the management server 20, the processor 11 determines NO in ACT 4 and makes an error.

If the log-in is an error, the teacher who possesses the information terminal 10 performs a release operation of the error from the touch panel 14. If the release operation is performed, the processor 11 restarts the process from ACT 1. Therefore, the teacher logs in, again.

If the approval response command is received from the management server 20, the processor 11 determines YES in ACT 4 and proceeds to ACT 5. The processor 11 stores the group ID included in the approval response command in the external memory 13 as ACT 5.

The processor 11 starts the camera 15 as ACT 6. If the camera 15 starts, the processor 11 displays a camera screen on the touch panel 14. If the teacher who checks the camera screen holds a lens of the camera 15 onto the lost article LA thereof so that the lost article LA including the emblem W fits on the camera screen.

The processor 11 waits for the camera 15 of reading of the lost article LA as ACT 7. If the lost article LA fits on the camera screen, the processor 11 determines that the lost article LA is read. The processor 11 determines YES in ACT 7 and proceeds to ACT 8.

The processor 11 controls the wireless unit 16 so that the command read in ACT 7 is transmitted to the management server 20. According to this control, the wireless unit 16 wirelessly transmits the read command. The read command is received by the access point 30 and sent to the management server 20 via the communication network 2. The image data of the group ID and the lost article LA are included in the read command.

The processor 21 of the management server 20 that receives the read command initiates the command reception process of the procedure illustrated in the flowchart of FIG. 9.

The processor 21 detects the group ID and the image data of the lost article LA from the read command as ACT 31.

The processor 21 extracts the area dictionary file 233 corresponding to the group ID as ACT 32. The processor 21 extracts an area of the emblem W attached to the lost article LA from the image data of the lost article LA detected in ACT 31 by using the dictionary information of the area dictionary file 233 as ACT 33. As the image division method, for example, Deep Learning using the Convolutional Neural Network (CNN) which is a method suitable for image recognition is used. As the image division method, Graph Cuts or the like may be used, and the method is not particularly limited.

The processor 21 extracts the recognition dictionary file 234 corresponding to the group ID as ACT 34. As ACT 35, the processor 21 performs a process of recognizing the emblem W from the image of the area of the emblem W extracted by the process of ACT 33, by using the dictionary information of the recognition dictionary file 234 thereof. As the image recognition method, for example, Deep Learning using the Convolutional Neural Network (CNN) which is a method suitable for image recognition is used. In addition, as the image recognition method, feature point matching or the like may be used, and the method is not particularly limited.

The processor 21 refers to the personal database 232 corresponding to the group ID, as ACT 36. The processor 21 checks whether there is the target emblem W that is recognized in the process of ACT 35 in the personal database 232 as ACT 37.

If there is not the target emblem W in the personal database 232, the processor 21 determines NO in ACT 37 and proceeds to ACT 38. The processor 11 controls the communication interface 24 so that the non-acquisition command is transmitted to the information terminal 10 as ACT 38. According to this control, the non-acquisition command is transmitted via the communication interface 24. The non-acquisition command is wirelessly transmitted from the access point 30 via the communication network 2 and is received by the information terminal 10 of the read command transmission source. With the above, the processor 21 ends the read command reception process.

If there is the target emblem W in the personal database 232, the processor 21 determines YES in ACT 37 and proceeds to ACT 39.

The processor 11 acquires the kindergartener ID and the name that correspond to the target emblem W of the personal database 232 as ACT 39.

The processor 11 controls the communication interface 24 so that the acquisition command is transmitted to the information terminal 10 as ACT 40. According to this control, the acquisition command is transmitted via the communication interface 24. The acquisition command is wirelessly transmitted from the access point 30 via the communication network 2 and is received by the information terminal 10 of the read command transmission source. The group ID, the kindergartener ID, and the name are included in the acquisition command. With the above, the processor 21 ends the read command reception process.

The description refers back to FIG. 7.

The processor 11 of the information terminal 10 that controls the transmission of the read command in ACT 9 waits for the acquisition command from the management server 20 as ACT 9. If the non-acquisition command is received from the management server 20, the processor 11 determines NO in ACT 9 and proceeds to ACT 10. The processor 11 displays an error on the touch panel 14 as ACT 10. With the above, the processor 11 ends the procedure information process illustrated in the flowchart of FIG. 7.

If the acquisition command is received from the management server 20, the processor 11 determines YES in ACT 9 and proceeds to ACT 11. The processor 11 detects the group ID and the kindergartener ID from the acquisition command thereof as ACT 11.

The processor 11 causes the touch panel 14 to display the kindergartener ID and the name as ACT 12. With the above, the processor 11 ends the procedure information process of the flowchart of FIG. 7.

As clearly understood from the above description, the management server 20 which is an example of the information processing device configures an acquisition unit by the processor 21 performing the process of ACT 31 of FIG. 9. That is, the management server 20 acquires the identification information according to the group to which the image data and the kindergartener according to the lost article LA to which the symbol of the user, that is, the emblem W of the kindergartener is attached belong.

The management server 20 configures a detection unit by the processor 11 performing the processes of ACTS 32 to 37 of FIG. 9. That is, the management server 20 performs analysis set for each item of the identification information according to the group with respect to the image data according to the lost article LA and detects the identification information that identifies the kindergartener included in the emblem W.

The management server 20 configures a specifying unit by the processor 21 performing the process of ACT 39 of FIG. 9. That is, the management server 20 specifies the kindergartener from the identification information detected by the detection unit.

In this manner, according to the present embodiment, if the teacher captures an image of the lost article LA with the information terminal 10, the analysis set for each group ID with respect to the image data according to the lost article LA is performed, and the kindergartener who is the owner thereof is specified from the emblem W attached to the lost article LA. The emblem W is a figure, a symbol, an image, or the like, and thus whether the identification information of the kindergartener is included is not known at first glance. Therefore, the owner of the lost article LA can be specified without being known by a third person.

In addition, the kindergartener is identified by combining one or the plurality of emblems W. Therefore, more kindergarteners can be identified with a smaller number of the emblems W. Further, with respect to the image data of the lost article LA to which the emblem W is attached, the area dictionary file 233 and the recognition dictionary file 234 set for each group ID are extracted, and the image division method and the image recognition method are applied. Accordingly, the emblem W stored in the personal data record of the personal database 232 corresponding to the group ID thereof can be accurately and securely recognized. Moreover, the emblem W of a character preferred by the kindergartener or an original character hand-written by the kindergartener can be attached to the belongings of the kindergartener. Therefore, the kindergartener can carry the belongings with satisfaction.

In the above, the embodiments of the information processing device and the control program thereof are described, but the embodiments are not limited thereto.

In the above embodiments, a case where the emblem W is attached to the lost article LA is described. The embodiments are not limited to the emblem W and may be applied to, for example, a seal.

According to the above embodiment, a case where the teacher possesses the information terminal 10 is described. For example, the information terminal 10 may be dedicated to the group and shared by teachers. In this case, the input of the teacher ID on the log-in screen may be omitted.

According to the embodiment, the management server 20 is described as an aspect of the information processing device. For example, the information terminal 10 further including a function as the management server 20 may be the information processing device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
a first acquisition component configured to acquire image data of a lost article to which an emblem associated with a kindergartener is attached;
a detection component configured to detect a first identification information that identifies the kindergartener associated with the emblem, based on the image data of the lost article acquired by the first acquisition component;
a specifying component configured to specify the kindergartener from the first identification information detected by the detection component; and
a second acquisition component configured to acquire a second identification information that identifies a group associated with a childcare institution to which the kindergartener belongs,
wherein the detection component is configured to detect the first identification information that identifies the kindergartner, based on a database corresponding to the second identification information that identifies the group acquired by the second acquisition component, and
wherein the database comprises a kindergartener ID, a name of the kindergartener, contact information of the kindergartener, and an image of the emblem for each group.

2. The information processing device according to claim 1,
wherein the emblem is a combination of a plurality of emblems.

3. The information processing device according to claim 1,
wherein the acquisition component comprises a camera.

4. A method of causing a computer of an information processing device to perform the following acts:
acquiring image data of a lost article to which an emblem associated with a kindergartener is attached;
detecting a first identification information that identifies the kindergartener associated with the emblem, based on the image data of the lost article; specifying the kindergartener from the first identification information;
acquiring a second identification information that identifies a group associated with a childcare institution to which the kindergartener belongs; and
detecting the first identification information that identifies the kindergartner, based on a database corresponding to the second identification information that identifies the group,
wherein the database comprises a kindergartener ID, a name of the kindergartener, contact information of the kindergartener, and an image of the emblem of each group.

5. The method according to claim 4,
wherein the emblem is a combination of a plurality of emblems.

6. The method according to claim 4,
wherein acquiring image data involves using a camera.

7. A method of matching a lost article with a kindergartener, comprising:
acquiring image data of the lost article to which an emblem associated with the kindergartener is attached;
detecting a first identification information that identifies the kindergartener associated with the emblem, based on the image data of the lost article;
specifying the kindergartener from the first identification information;
acquiring a second identification information that identifies a group associated with a childcare institution to which the kindergartner belongs; and
detecting the first identification information that identifies the kindergartner, based on a database corresponding to the second identification information that identifies the group, wherein the database comprises a kindergartener ID, a name of the kindergartener, contact information of the kindergartener, and an image of the emblem for each group.

* * * * *